US006519260B1

(12) United States Patent
Galyas et al.

(10) Patent No.: US 6,519,260 B1
(45) Date of Patent: Feb. 11, 2003

(54) REDUCED DELAY PRIORITY FOR COMFORT NOISE

(75) Inventors: Peter Galyas, Täby (SE); Lars Westberg, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/268,751

(22) Filed: Mar. 17, 1999

(51) Int. Cl.$^7$ ............... H04L 12/28; H04L 12/56; H04B 7/212; H04M 11/10
(52) U.S. Cl. ............... 370/395.42; 370/444; 370/411; 455/466; 455/445
(58) Field of Search ............... 455/445, 466, 455/512; 370/389, 355, 349, 351, 352, 411, 444, 455, 493, 494, 495, 395, 42; 340/825.03, 825.5, 825.51, 825.52

(56) References Cited

U.S. PATENT DOCUMENTS

| | | | |
|---|---|---|---|
| 5,130,985 A | * | 7/1992 | Kondo et al. ............ 370/400 |
| 5,142,582 A | | 8/1992 | Asakawa et al. ............ 381/36 |
| 5,475,712 A | | 12/1995 | Sasaki ............ 375/241 |
| 5,521,925 A | * | 5/1996 | Merakos et al. ............ 455/450 |
| 5,537,509 A | | 7/1996 | Swaminathan et al. .... 395/2.37 |
| 5,553,192 A | | 9/1996 | Hayata ............ 395/237 |
| 5,559,832 A | | 9/1996 | Laird ............ 375/244 |
| 5,612,955 A | * | 3/1997 | Fernandes et al. ............ 370/433 |
| 5,630,016 A | | 5/1997 | Swaminathan et al. .... 395/2.37 |
| 5,632,004 A | | 5/1997 | Bergström ............ 395/242 |
| 5,657,421 A | | 8/1997 | Lorenz et al. ............ 395/2.32 |
| 5,680,508 A | | 10/1997 | Liu ............ 395/2.36 |
| 5,706,394 A | | 1/1998 | Wynn ............ 395/2.28 |
| 5,722,086 A | | 2/1998 | Teitler et al. ............ 455/561 |
| 5,754,537 A | | 5/1998 | Jamal ............ 370/330 |
| 5,794,199 A | | 8/1998 | Rao et al. ............ 704/258 |
| 5,802,465 A | | 9/1998 | Hamalainen et al. ....... 455/403 |
| 5,809,460 A | | 9/1998 | Hayata et al. ............ 704/225 |
| 5,812,965 A | | 9/1998 | Massaloux ............ 704/205 |
| 5,819,218 A | | 10/1998 | Hayata et al. ............ 704/233 |
| 5,878,036 A | | 3/1999 | Spartz et al. ............ 370/335 |
| 6,067,301 A | * | 5/2000 | Aatresh ............ 370/418 |
| 6,125,110 A | * | 9/2000 | Proctor et al. ............ 370/331 |
| 6,172,971 B1 | * | 1/2001 | Kim ............ 370/348 |

OTHER PUBLICATIONS

Adil Benyassine, Eyal Shlomot and Huan–Yu Su, "ITU–T Recommendation G.729 Annex B: A Silence compression Scheme for Use with G. 729 Optimized for V.70 Digital Simultaneous Voice and Data Applications", IEEE Communications Magazine, Sep. 1997, pp. 64–73.

European Telecommunication Standard, European Digital Cellular Telecommunications System; Half rate speech Part 5: Discontinuous Transmission (DTX) for half rate speech traffic channels (GSM 06.41), Nov., 1995, pp. 1–16.

* cited by examiner

*Primary Examiner*—Dwayne Bost
*Assistant Examiner*—Raymond B. Persino

(57) ABSTRACT

A system and method reduces the delay of speech processing over a packet-switched network in a discontinuous transmission system. According to exemplary embodiments, a base transceiver station assigns priority indicators to information received therein. When the information is speech or a first SID frame, a high priority indicator is assigned. When the information is a SID update frame, a low priority indicator is assigned. The information is transferred from the base transceiver station to a base station controller in an order determined by the priority indicators. As such, the delay in transferring and processing speech information is reduced.

20 Claims, 4 Drawing Sheets

REDUCED DELAY PRIORITY FOR COMFORT NOISE

BACKGROUND

The present invention relates generally to radiocommunication systems and, more particularly, to techniques and structures for reducing the delay priority of comfort noise transmissions.

The cellular industry has made phenomenal strides in commercial operations both in the United States and the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as to maintain high quality service and avoid rising prices.

In addition to the challenges posed by a need for greater system capacity, the designers of the remote units used in radio communication systems, e.g., mobile phones, have their own unique set of challenges. For example, a well known challenge in the industry is to extend the time between recharging batteries used to power these remote units, while at the same time continuing to provide additional functionality to satisfy subscriber demand. These competing desires have lead remote unit designers to search for creative ways in which to further reduce energy consumption in remote units.

As the radiocommunication industry matures, various subscriber usage patterns have been recognized. For example, it has been found that during a typical voice connection between two subscribers, the actual voice activity transmitted over the air interface accounts for less than 50% of the total connection time. Therefore, in an attempt to conserve power, remote units have been designed to actuate the transmission circuitry only during the voice-active portion of a call and render the transmission circuitry inoperative during periods of silence. This has been implemented, for example, using a detector for detecting voice activity and a discontinuous transmitter (DTX) that becomes inoperative when the voice activity detector (VAD) detects a pause in the user's speech. As one skilled in the art will appreciate, this technique has been shown to reduce interference thereby leading to higher system capacity. The DTX technique also reduces power consumption of the remote units by turning off the transmitting circuitry for extended periods of time. Additional information regarding the use of a VAD in a discontinuous transmission system is described in commonly assigned, U.S. Pat. No. 5,881,373 to R. Elofsson et al., entitled "Muting the Microphone in Radiocommunication Systems," the entirety of which is incorporated by reference herein.

While this technique has been shown to reduce interference and the power consumption of remote units, it poses a problem for reproduction of the voice signal at the receiving side. Specifically, since the transmitter is turned off during periods of silence, the background noise that would otherwise be transmitted over the air interface is not received by the other subscriber's equipment. This, in turn, results in a reproduced voice that is discontinuous and includes audible artifacts, e.g., popping sounds.

One way to overcome this difficulty is to generate artificial background noise for reproduction at the receiving side when no voice signal is transmitted. This artificial background noise is commonly referred to as "comfort noise".

Comfort noise can be generated by adaptive functions that monitor the background noise picked up by the microphone of a remote unit. When a pause in speech is detected, the comfort noise functions generate comfort noise information that is transmitted over the air interface instead of speech information. This information takes relatively little time to transmit, thereby allowing the transmitter to be turned off during most of each period of silence. At the receiving end, the comfort noise information is used to generate background noise so that the listener is not troubled by the discontinuity in transmission.

Such a comfort noise generation technique is currently available in GSM. Therein, a comfort noise evaluation algorithm is used in a remote unit's speech encoder to create parameters that include information on the level and spectrum of the background noise. The evaluated comfort noise parameters are then encoded into a Silence Descriptor (SID) frame for transmission to the receiver. The SID frame is transmitted at the end of a speech burst, i.e., before the transmitter is switched off. As such, the SID frame also serves to initiate the comfort noise generation on the receiver side. If, after transmission of the first SID frame, the period of silence continues, SID update frames are transmitted by the remote unit. A SID update frame performs several functions. It indicates not only that the period of speech inactivity continues, but also that the cellular connection is still present. Moreover, the SID update frame serves to update the background noise detected at the remote unit.

The interval at which these SID update frames are transmitted depends on the type of speech coder employed. For example, for Full Rate (FR) and Enhanced Full Rate (EFR) speech coders in GSM, the rate at which SID frames are transmitted is FN MOD 104=52, where FN is the Frame Number. This corresponds to SID frames being transmitted approximately every 480 ms. For a Half Rate speech coder, the rate at which SID frames are transmitted is doubled, i.e. every 240 ms. Moreover, for the newly developed Adaptive Multi-Rate (AMR) speech coder, the SID transmit rate is predicted to be up to four times higher than for the FR or EFR coders, i.e. every 120 ms.

While speech has been and will continue to be an important part of mobile communications, usage of mobile communication equipment for transmission of data rather than speech has become increasingly popular by consumers over the past decade. The possibility to send and receive electronic mail and to use a web browser to obtain world-wide-web access is frequently discussed as services that will be more and more used in wireless communication systems.

There are fundamental differences between requirements for data communication and e.g., speech communication. For example, delay requirements are higher for speech, which is a real time service, and the error requirements are higher for data communication, while the delay constraints are lower. The use of packet data protocols, which are more suitable for transmission of data than circuit-switched protocols, starts to find its way into cellular communication systems. Packet service integration in both GSM cellular systems as well as DAMPS cellular systems is presently being standardized. As a result, cellular components (e.g., base transceiver stations, base station controllers, etc.) are being adapted to handle packet data services.

Therefore, when introducing packet data services into, for example, a GSM cellular system, designers need to consider the delay requirements of the information transmitted. For example, it is well established that speech is the most delay sensitive traffic and should be put into the highest priority class. Other services, which are more delay tolerant, such as packet data transmissions, can be put into a lower priority class. However, the conventional DTX technique within GSM is not conducive to such prioritization. For example, as set forth above, the conventional DTX technique in GSM specifies specific intervals at which SID update frames are transmitted. Under the conventional DTX scheme, these SID update frames, which are not as delay-sensitive as actual speech frames, are processed by the base transceiver station and base station controller at the same level of priority as speech frames. This is evident from the fact that the conventional DTX scheme correlates speech calls using the same FN counter irrespective of the speech activity. As such, the gain of statistical multiplexing (i.e., the ability to integrate calls based on the statistics of the speech source), which is common to the DTX scheme, is reduced thereby leading to higher bandwidth demands or longer speech delays.

There exists a need for a system and method that prioritizes information transmitted in a radiocommunication system so as to allow for better utilization of transmission resources.

SUMMARY

The present invention seeks overcome the above deficiencies in the art by providing a system and method for reducing the delay of speech processing in a discontinuous transmission system. According to exemplary embodiments of the present invention, a base transceiver station assigns priority indicators to information received therein. When the information is speech or a first SID frame, a high priority indicator is assigned. When the information is a SID update frame, a low priority indicator is assigned. The information is transferred from the base transceiver station to a base station controller in an order determined by the priority indicators. As such, the delay in transferring and processing speech information is reduced.

BRIEF DESCRIPTION OF THE DRAWINGS

The above objects and features of the present invention will be more apparent from the following description of the preferred embodiments with reference to the accompanying drawings, wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 1:
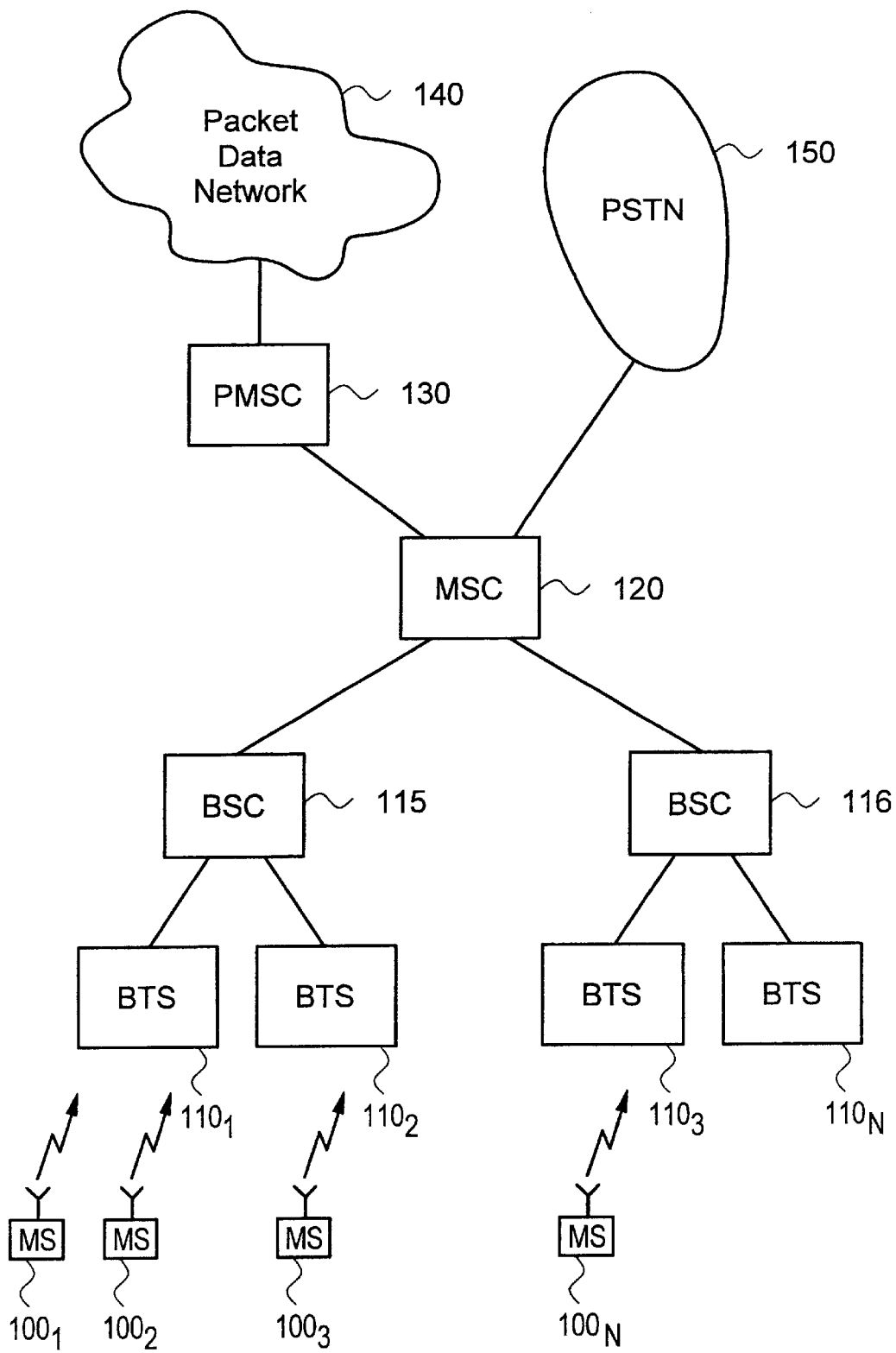
FIG. 1 illustrates an exemplary system into which the prioritization technique of the present invention may be employed.

FIG. 1 illustrates an exemplary system into which the prioritization technique of the present invention may be employed. In FIG. 1, the exemplary system includes a plurality of mobile stations (MS) $100_1$–$100_N$, a plurality of base transceiver stations (BTS) $110_1$–$110_N$, two base station controllers (BSC) 115 and 116, a mobile services switching center (MSC) 120, a packet mobile services switching center (PMSC) 130 that is connected to a packet network 140, such as the Internet, and a public switched telephone network (PSTN) 150. In operation, the plurality of mobile stations $100_1$–$100_N$ communicates with a respective base transceiver station in a well known manner. According to the present invention, each mobile station comprises a discontinuous transmitter and voice activity detector (not shown) that operate in the manner described above. As such, each mobile station transmits speech frames, as well as SID frames. Each mobile station is also capable of transmitting packet data and fax/modem information.

The base transceiver stations $110_1$–$110_N$, in conjunction with the base station controllers 115 and 116, receive information from the mobile stations, process the information and forward the processed information to the MSC 120. One skilled in the art will appreciate that a BTS and BSC pair also receives information from MSC 120 and transfers such information to one or more mobile stations.

At the MSC 120, information from the base station controller is routed to its destination (e.g., the PSTN 150 when the information is speech or fax/modem data and through the PMSC 130 to its destination on the packet data network 140 when the information is packet data). One skilled in the art will appreciate that the network illustrated in FIG. 1 would typically include other components, such as routers (not shown), that aid in the reception, processing and transmission of information in the network. Moreover, the number of each of the components depicted in FIG. 1 is reduced for the sake of simplicity. Radio communication systems generally include multiple base station controllers, MSCs, PMSCs, etc.

Figure 2:
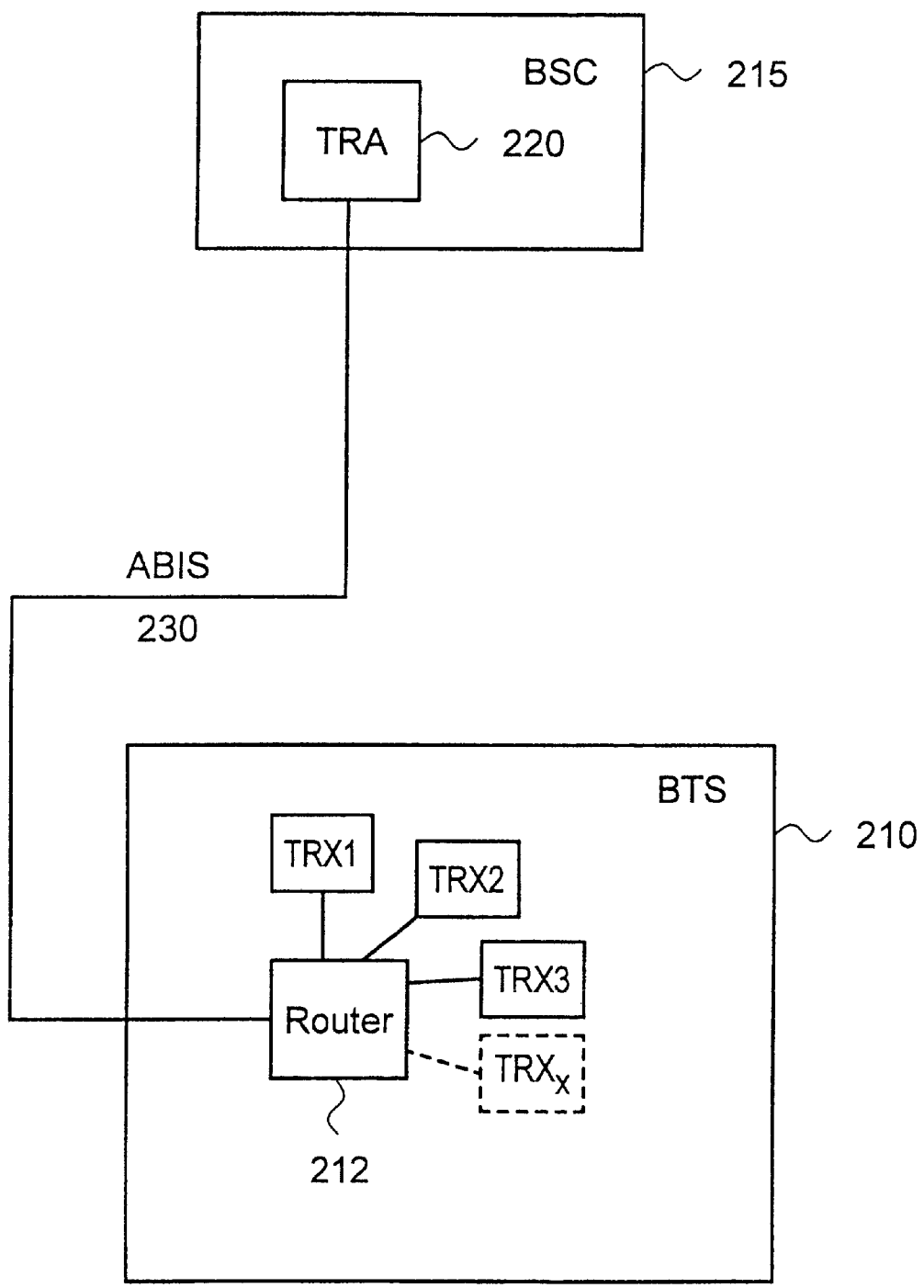
FIG. 2 illustrates a base transceiver station and base station controller for processing mobile station transmissions according to the conventional DTX scheme.

FIG. 2 illustrates a base transceiver station and base station controller for processing mobile station transmissions according to the conventional DTX scheme. As illustrated, the base transceiver station 210 receives information from, and transmits information to, a group of mobile stations using a plurality of transceivers TRX1–TRXx. Each transceiver is capable of handling speech communications. Base transceiver station 210 also comprises a router 212 which controls the routing of information over the interface 230 (known in GSM as the "Abis" interface) that connects the base transceiver station 210 and the base station controller 215.

The base station controller 215 comprises a transcoder (TRA) 220 that processes information received in the base station controller 215. One skilled in the art will appreciate that a typical base transceiver station and base station controller would generally include more components than those illustrated in FIG. 2 that aid in receiving, transmitting, and processing of information.

In order to illustrate the shortcomings of the conventional DTX scheme, consider the following example. Assume that each of the plurality of transceivers TRX1–TRXx receives either speech frames or SID frames during a first time slot. The received frames are decoded by a respective TRX, placed into packets and transferred to the router 212. If the base transceiver station's internal bandwidth (i.e., the bandwidth of the bus connecting a respective TRX to the router) is high enough to allow for a TRX's entire packet to be transferred, then internal queuing within the TRX can be avoided. If the bandwidth is not high enough, then each TRX will contain an internal queue (not shown) that allows for temporary storage of the packet. A typical bandwidth of a base transceiver station's internal bus is generally greater than 2 Mbps.

In the router 212, the packets formed by the TRXs containing information received during the first time slot are then transferred to the base station controller. Depending on the bandwidth of the Abis interface, some packets may have to be queued in the router prior to transfer (i.e, if the Abis interface bandwidth is less than x*bandwidth of the internal bus, packets will be queued prior to transfer). A typical bandwidth on the Abis interface is 2 Mbps. Regardless of packet queuing, all packets received during the first time slot are sent to the base station controller prior to any packets from the second time slot being forwarded. The packets from the second time slot are generally ready one burst time (~0.6 ms in this exemplary GSM embodiment) after those of the first time slot.

In the base station controller 215, the transcoder 220 processes the packets received during the first time slot irrespective of the packet's contents. That is, the transcoder 220 processes packets that contain only SID update information with the same priority as it processes packets containing speech information. As such, processing of speech information, which is the most delay-sensitive traffic, is delayed in those instances where packets containing SID update information have been received prior to the speech information.

The present invention seeks to overcome the above-identified deficiencies by providing a system and method that prioritizes the information received at a transceiver of a base transceiver station. For example, the present invention recognizes that SID update frames are not as delay-sensitive as speech information. In fact, in those instances where SID update frames are not received, a slow muting procedure is generally initiated to provide acceptable background sound. As such, delays in processing SID update frames are not the most significant factor in providing acceptable received signal quality to cellular users.

According to exemplary embodiments of the present invention, the conventional DTX scheme is split into at least two different processes. A first process handles high priority transfers (i.e., those packets that contain either speech information or the first SID frame) while a second process handles lower priority transfers (i.e., those packets that contain lower priority information, such as SID update frames, packet data, etc.).

Figure 3:
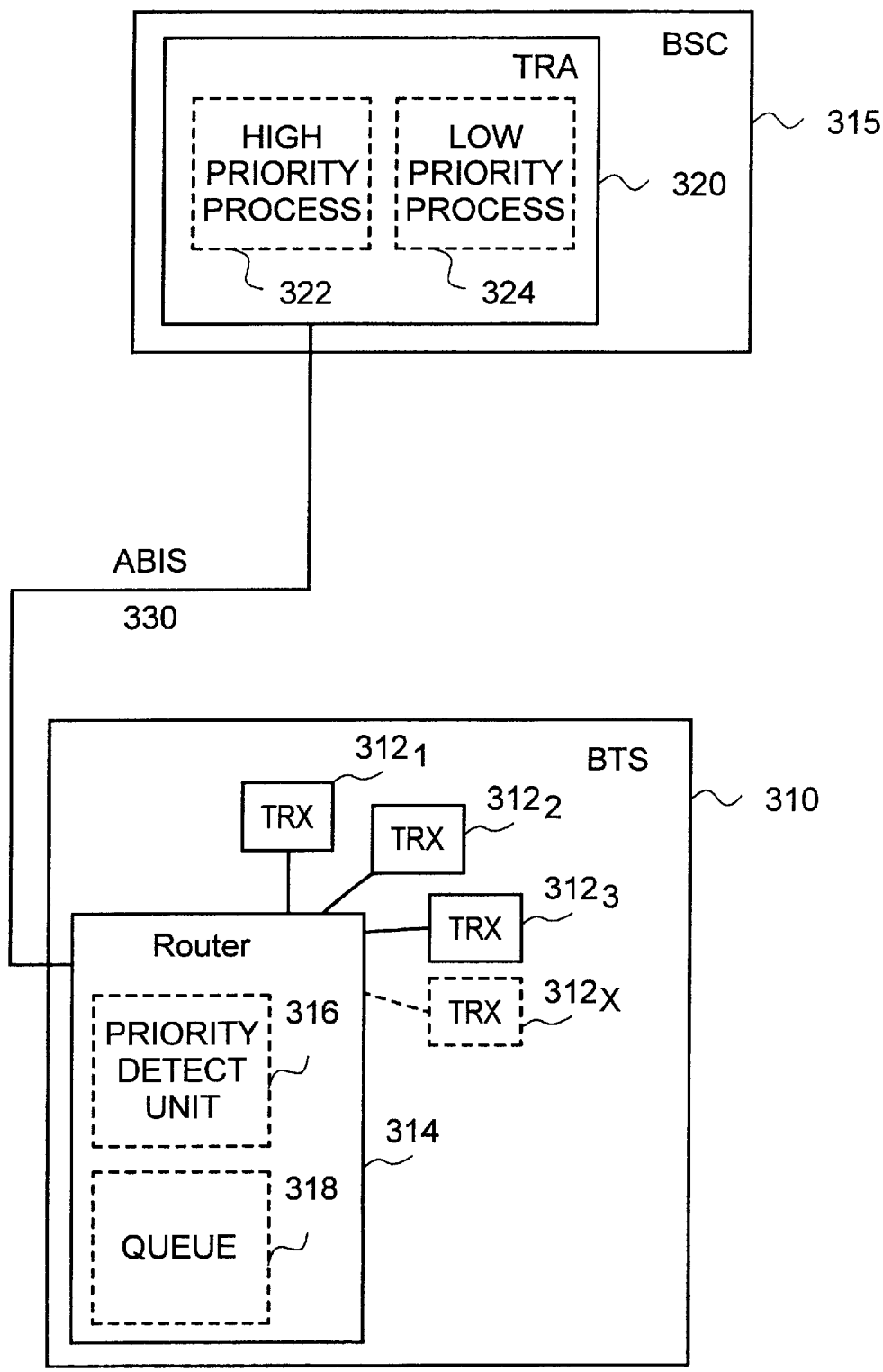
FIG. 3 illustrates an exemplary base transceiver station and base station controller into which the prioritization technique of the present invention may be employed.

FIG. 3 illustrates an exemplary base transceiver station and base station controller in which the prioritization technique of the present invention may be employed. In FIG. 3, the base transceiver station 310 comprises a plurality of transceivers $312_1$–$312_x$ which are connected to a router 314 via separate internal buses. The router 314 comprises a priority detection unit 316 and a queue 318. Similar to the conventional system described above with respect to FIG. 2, the router 314 is connected to the base station controller via the Abis interface 330. The base station controller 315 comprises a transcoder 320 which includes two speech decoder processes: a high priority process for handling speech decoding and comfort noise generation for the first SID frame and a low priority process for handling lower priority information, such as comfort noise updates (i.e., SID update frames). One skilled in the art will appreciate that, as an alternative, transcoder 320 could actually be two separate transcoders, one for handling high priority packets and one for handling low priority packets. Moreover, while the router in FIG. 3 is depicted as having a single queue, it will be appreciated that the router could, alternatively, comprise multiple queues for storing together packets having the same priority. In such an event, the base transceiver station may also include a scheduler for scheduling the routing of the packets stored in the multiple queues over the Abis interface.

In operation, transceivers $312_1$–$312_x$ receive speech frames or SID frames from a plurality of mobile stations during a first time slot. The received frames are decoded by a respective transceiver. During the decoding process, the transceiver determines whether the received information is speech information, a first SID frame which, as set forth above, signals the switching from a speech state to a comfort noise state and carries comfort noise information, or lower priority information such as a SID update frame which, among other things, updates the comfort noise. The decoded information is then placed into a packet. As one skilled in the art will appreciate, packets generally contain a header that provides such information as the type of speech service (e.g., full rate), control information, and the like. According to the present invention, a priority information field is added to the packet's header. The priority information contained therein indicates, for example, whether the information being transmitted within the packet is one of speech information, the first SID frame or a SID update frame. It will be appreciated that the priority information may be a plurality of bits in order to allow for multiple levels of priority to be assigned or simply a single bit. Where the priority information is a single bit (i.e., a "1" or a "0") the priority information indicates one of "high" or "low" priority. When the packet contains speech information or the first SID frame, the priority bit is set so as to indicate high priority (e.g., setting the priority bit to a "1" could indicate high priority). When the packet contains SID update information, the priority bit is set to indicate low priority (e.g., a "0"). Once formed, the packets are transferred from the transceivers $312_1$–$312_x$, to the router 314 where they are stored in queue 318. It will be appreciated that when synchronized transceivers exist, the packets will be received in the router 314 simultaneously.

In the router 314, a priority detection unit 316 detects the level of priority for each packet stored. The router 314 transfers packets to the base station controller 315 in an order of priority determined by the priority detection unit 316. The router 314 transfers high priority packets (i.e., those packets containing speech information or a first SID frame) via the Abis interface 330 to the transcoder 320 for processing ahead of low priority packets (i.e., those packets containing, for example, SID update information). In the base station controller 315, high priority packets are processed by the high priority process 322 of transcoder 320 and low priority packets are processed by the low priority process 324. By assigning packets containing SID update information a low priority indication, speech transfer delays are reduced. Moreover, by using separate processes in the base station controller for handling high and low priority packets, speech processing delays can also be reduced.

Figure 4A:
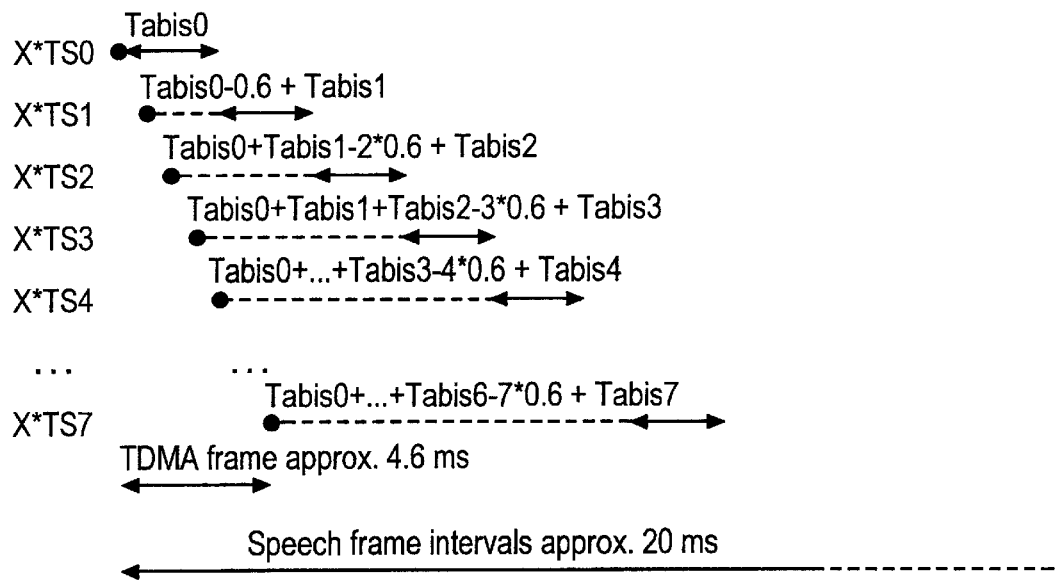
FIGS. 4A and 4B illustrate exemplary time charts that depict the queuing and the Abis interface transmission delay associated with packets transferred from the router to the base station controller when speech frames are received over each of a plurality of time slots and when SID update frames are received over one of a plurality of time slots, respectively.
Figure 4B:
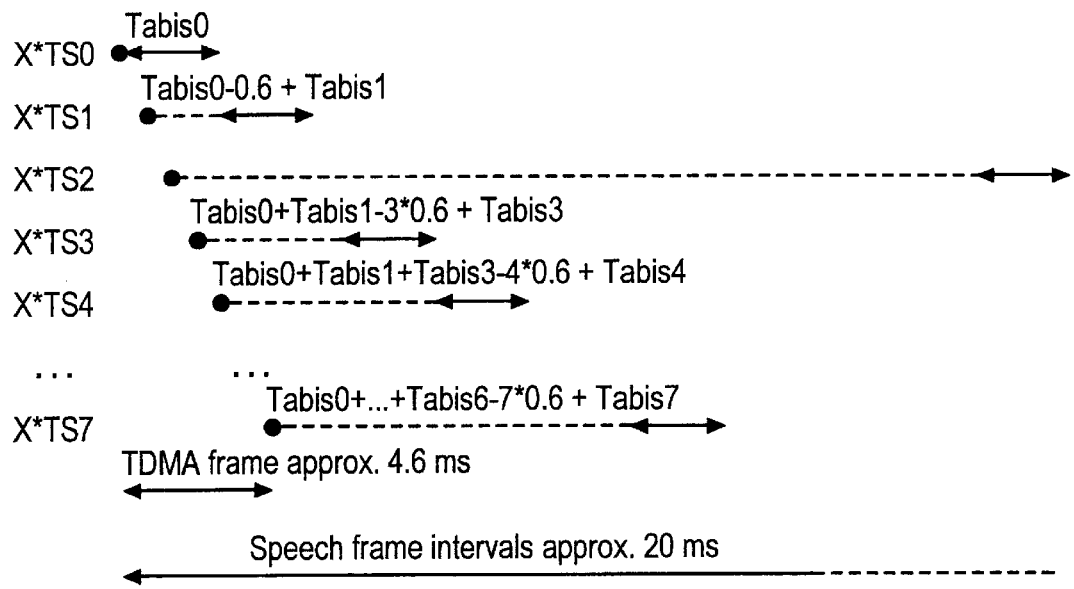

FIGS. 4A and 4B illustrate exemplary time charts that depict the queuing and Abis interface transmission delay, according to the present invention, associated with packets transferred from the router to the base station controller when speech frames are received over each of a plurality of time slots and when SID update frames are received over one of a plurality of time slots, respectively. In FIGS. 4A and 4B, the queuing and Abis interface transmission delay is denoted "Tabis". As will be appreciated by those skilled in the art, Tabis is a function of, for example, the speech activity, time slot number (TS: 0, . . . , 7), the number of TRXs (x), and the existence of an active call using any given time slot (since some channels may be inactive).

In FIG. 4A, it is assumed that for all time slots TS0–TS7, each of the x transceivers depicted in FIG. 3 are in an active speech state (i.e., they are receiving speech information). As such, each packet transferred from the transceivers to the router over all 8 time slots are designated by the transceivers as high priority. As a result, the groups of packets are sequentially transferred to the base station controller (i.e., the packets for TS0 are transferred first, the packets for TS1 are transferred second, etc.). Referring to FIG. 4A, the transfer of the TS0 packets to the base station controller is delayed by the value Tabis0 (i.e., the queuing and Abis interface transmission delay for time slot 0). For time slot 1, the delay for the TS1 packets is Tabis0–0.6+Tabis1. As set forth above, the value 0.6 is the time, in milliseconds, at which the packets for the next time slot are ready for transfer in this exemplary GSM embodiment. One skilled in the art will appreciate that the time chart illustrated in FIG. 4A would also represent transmission delays for the conventional system described above with respect to FIG. 2 wherein the groups of packets are sequentially transferred irrespective of the contents of the packets.

FIG. 4B illustrates the advantages of the present invention. In FIG. 4B, it is assumed that for time slot TS2 all transceivers receive SID update information. For all other time slots, the transceivers receive either speech information or the first SID frame. As illustrated, the transfer of the group of packets for time slot TS2 is delayed so that the higher priority packets received during TS3–TS7 can be immediately processed. Therefore, the higher priority packets from TS3–TS7 experience reduced delay while the lower priority packets of TS2 experience longer delays. As a result, speech processing delays are reduced.

For the calls using TS2, the extra delay due to queuing will not cause problems at the transcoder since the speech decoding process is de-coupled from the comfort noise update process. That means that the comfort noise will be updated somewhat later, which does not impact the speech quality, since the coding of the comfort noise is averaged over several 20 ms frames in the speech coder side.

While the above-described examples disclosed the group of packets for each time slot containing the same type of information, it will be appreciated by one skilled in the art that the priority assignment technique of the present invention is equally applicable to those situations where, during a single time slot, some of the transceivers receive, for example, speech information (i.e., high priority information) while others receive, for example, SID update information (i.e., lower priority information). In such situations, it is possible to delay the transfer of the lower priority packets for a specific time slot while the higher priority packets from that time slot are transferred to and processed by the base station controller.

In order to illustrate this, suppose during time slot 1 that transceivers 1–3 receive speech information while transceivers 4 and 5 receive SID update information. Each transceiver forms a packet and assigns the appropriate priority information (i.e., a high priority indication for the packets formed by transceivers 1–3 and a low priority indication for the packets formed by transceivers 4 and 5). The transceivers transfer the packets to the router where they are stored in the queue. Suppose that during time slot 2 that each transceiver (i.e., transceivers 1–5) receives speech information. As such, each transceiver forms a packet having a high priority indication. If, due to a narrow Abis interface bandwidth, the packets from time slot 2 are queued in the router prior to the transfer of the low priority packets from time slot 1 to the base station controller, then the router delays the transfer of the low priority packets from time slot 1 and transfers the high priority packets from time slot 2. In order to avoid system complexities, it is advisable that all packets from a single TDMA frame be transferred to the base station controller prior to packets from subsequent frames being transferred. This avoids the problem with low priority packets being delay beyond an acceptable time period.

The "round-trip delay" for the Abis interface is, when using 16 kbps STM, 23.85 ms for circuit-switched transmissions. This value should also be the goal when using packet-oriented transmissions. However, it will be appreciated that the distribution of the delays for the uplink and downlink will be different. For instance, it has been determined that the Tabisd (i.e., the Tabis for the downlink) should be less than 17.4 ms, but Tabisu will probably exceed 4.0 ms (see the GSM Recommendation 03.05, Version 5.0.0, November 1996, p. 16 and 17). If a symmetrical traffic load is assumed, then the Tabisu and Tabisd could be defined as 12 ms. As set forth above, the bandwidth of the Abis interface and the delay due to queuing are both factors to be considered in reaching this 12 ms goal.

While the above-described embodiments applied the priority assignment technique of the present invention to uplink transmissions, one skilled in the art will appreciate that the present invention applies equally well to downlink transmissions (i.e. transmissions from the base station controller to the base transceiver station). In the case of downlink transmissions, the base station controller's transcoder assigns priority information to the packets transmitted to the base transceiver station. Thereafter, the base transceiver station prioritizes the transmission of the information contained in the packets over the air interface.

The present invention provides better utilization of transmission resources due to a more efficient statistical multiplexing of the speech information. As a result, a higher payload per link or lower speech delays can be achieved. Moreover, by using separate processes in the base station controller for processing high priority packets (e.g., those packets containing speech information or the first SID frame) and low priority packets (e.g., those packets containing SID update information) speech processing delays are reduced.

The foregoing has described the principles, preferred embodiments and modes of operation of the present invention. However, the invention should not be construed as being limited to the particular embodiments discussed above. For example, while the above-described embodiments applied the priority assignment technique of the present invention to speech communications, one skilled in the art will appreciate that the present invention is equally applicable to packet data systems and to systems integrating both voice and packet data. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for transferring packets in a discontinuous transmission system, said method comprising the steps of:
assigning packets which contain a first silence descriptor (SID) frame a high priority indication;
assigning packets containing silence descriptor (SID) update information a low priority indication; and
transferring packets in accordance with the priority indications.

2. The method of claim 1 wherein said steps of assigning are performed by a transceiver.

3. The method of claim 1 wherein said step of transferring is performed by a router.

4. The method of claim 1 further comprising the steps of:
storing said packets, prior to said step of transferring, in a queue; and
determining an order of transfer of said packets based on said priority indications.

5. The method of claim 1 including the step of assigning packets containing speech information a high priority indication.

6. A system for transferring packets in a discontinuous transmission system, said system comprising:
means for assigning packets which contain a first silence descriptor (SID) frame a high priority indication;
means for assigning packets containing silence descriptor (SID) update information a low priority indication; and
means for transferring said packets in accordance with the priority indications.

7. The system of claim 6 wherein said high and low priority indications are assigned by a transceiver.

8. The system of claim 6 wherein said means for transferring is a router.

9. The system of claim 6 further comprising:
a queue for storing said packets prior to transfer; and
means for determining an order of transfer of said packets based on said priority indications.

10. The system of claim 6 further comprising means for assigning packets containing speech information a high priority indication.

11. A method for prioritizing the transfer of packets in a discontinuous transmission system, said method comprising the steps of:
receiving information, said information including speech information, a first silence descriptor (SID) frame, and a silence descriptor (SID) update frame;
decoding said received information;
determining a priority of said received information;
assigning speech information or a first silence descriptor (SID) frame a high priority indication;
assigning a silence descriptor (SID)) update frame a low priority indication;
forming a packet containing said decoded information and an indication of said determined priority; and
transferring said packet in an order determined by said priority indication.

12. A transceiver comprising:
means for receiving information, said information including speech information, a first silence descriptor (SID) frame, and a silence descriptor (SID) update frame;
a decoder for decoding said information;
means for determining a priority of said information wherein said speech information and said first silence descriptor (SID) frame are assigned a high priority indication and said silence descriptor (SID) update frame is assigned a low priority indication; and
means for placing said decoded information into a packet, said packet containing an indication of said priority.

13. A method for processing information in a discontinuous transmission system, said method comprising the steps of:
receiving information, said information including speech information, a first silence descriptor (SID) frame and a silence descriptor (SID) update frame;
assigning a priority to said information based on an information type; and
processing said information in a high priority process when said information is speech information or said first silence descriptor (SID) frame and processing said information in a low priority process when said information is said silence descriptor (SID) update frame.

14. The method of claim 13 wherein said high priority process and said low priority process are separate processes performed by a single transcoder.

15. The method of claim 13 wherein said high priority process and said low priority process are individually performed by separate transcoders.

16. A system for processing information in a discontinuous transmission system, said system comprising:
at least one transceiver for receiving information, said information including speech information, a first silence descriptor (SID) frame and a silence descriptor (SID) update frame and assigning a priority to said information based on whether said information is speech information, a first silence descriptor (SID) frame or a silence descriptor (SID) update frame;
a router for routing said information in an order based on said priority; and
a transcoder for processing said information in a high priority process when said information is speech information or said first silence descriptor (SID) frame and processing said information in a low priority process when said information is said silence descriptor (SID) update frame.

17. The system of claim 16 wherein said high priority process and said low priority process are separate processes.

18. The system of claim 16 wherein said transcoder is two transcoders, one for performing said high priority process and one for performing said low priority process.

19. A method for transmitting information in a radiocommunication environment, said method comprising the steps of:
assigning a priority indication to information at a base station controller based upon information type;
transferring said prioritized information to a base transceiver station;
transmitting said information to a mobile station in an order based on said priority indication;
wherein a higher priority indication is provided to speech and first silence descriptor (SID) information and a lower priority indication is provided to silence descriptor (SID) update information.

20. A system for transmitting information in a radiocommunication environment, said system comprising:
a base station controller for assigning a priority indication to information based upon information typo and transferring said information along with said priority indication; and a base transceiver station for receiving said information and priority indication and transmitting said information to a mobile station in an order based on said priority indication;

wherein a higher priority indication is provided to speech and first silence descriptor (SID) information and a lower priority indication is provided to silence descriptor (SID) update information.

* * * * *